US012602304B2

(12) United States Patent
Kommula et al.

(10) Patent No.: US 12,602,304 B2
(45) Date of Patent: Apr. 14, 2026

(54) SELF-LEARNING GREEN APPLICATION WORKLOADS

(71) Applicant: Juniper Networks, Inc., Sunnyvale, CA (US)

(72) Inventors: Raja Kommula, Cupertino, CA (US); Thayumanavan Sridhar, Sunnyvale, CA (US); Raj Yavatkar, Los Gatos, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 171 days.

(21) Appl. No.: 18/305,194

(22) Filed: Apr. 21, 2023

(65) Prior Publication Data

US 2023/0342275 A1     Oct. 26, 2023

Related U.S. Application Data

(60) Provisional application No. 63/363,614, filed on Apr. 26, 2022.

(51) Int. Cl.
*G06F 11/30* (2006.01)
*G06F 9/50* (2006.01)

(52) U.S. Cl.
CPC ........ *G06F 11/3058* (2013.01); *G06F 9/5088* (2013.01)

(58) Field of Classification Search
CPC . G06F 11/3058; G06F 11/3062; G06F 9/5088
See application file for complete search history.

(56) References Cited

U.S. PATENT DOCUMENTS 7,742,830 B1 * 6/2010 Botes .................... G06F 9/4893
700/32
7,962,769 B1 * 6/2011 Patel ........................ G06F 1/26
713/300

(Continued)

FOREIGN PATENT DOCUMENTS

CN       113408898 A * 9/2021 ............. G06Q 10/06
WO     2013184846 A1   12/2013

OTHER PUBLICATIONS

Extended Search Report from counterpart European Application No. 23201078.5 dated Mar. 19, 2024, 11 pp.

(Continued)

*Primary Examiner* — Vincent H Tran

(74) *Attorney, Agent, or Firm* — Shumaker and Sieffert PA

(57)     ABSTRACT

Techniques are described for determining the energy usage of a data center and invoking one or more actions to improve the energy usage of the data center. For example, a computing system may obtain energy usage data of a data center deploying an application. The computing system may also determine, based on a comparison of the energy usage data of the data center deploying the application to a percentage of energy provided by one or more renewable energy sources to the data center, a green quotient of the application that specifies a value that indicates whether the data center deploying the application is energy efficient. The computing system may further invoke, based on the green quotient of the application that specifies a value that indicates the data center deploying the application is not energy efficient, an action to improve energy usage of the data center deploying the application.

20 Claims, 7 Drawing Sheets

(56) References Cited

U.S. PATENT DOCUMENTS

| | | | |
|---|---|---|---|
| 9,557,792 B1 | 1/2017 | Potlapally et al. | |
| 9,571,394 B1 | 2/2017 | Sivaramakrishnan et al. | |
| 9,800,052 B2 * | 10/2017 | Li | H02J 3/46 |
| 2009/0187775 A1 | 7/2009 | Ishikawa | |
| 2009/0231152 A1 * | 9/2009 | Tung | G06F 1/206 |
| | | | 340/660 |
| 2010/0328849 A1 * | 12/2010 | Ewing | G06F 11/3089 |
| | | | 361/622 |
| 2012/0083938 A1 * | 4/2012 | Takagi | H02J 3/14 |
| | | | 700/286 |
| 2013/0212410 A1 * | 8/2013 | Li | G06F 1/263 |
| | | | 713/300 |
| 2013/0275794 A1 | 10/2013 | Annavaram et al. | |
| 2014/0298094 A1 * | 10/2014 | Aliberti | G06F 1/28 |
| | | | 714/30 |
| 2016/0087909 A1 | 3/2016 | Chatterjee et al. | |
| 2016/0109916 A1 * | 4/2016 | Li | H02J 7/35 |
| | | | 700/295 |
| 2018/0165772 A1 * | 6/2018 | Crawford | G06Q 50/06 |
| 2020/0037473 A1 | 1/2020 | Kommula et al. | |
| 2020/0145107 A1 | 5/2020 | Tittenhofer | |
| 2020/0275369 A1 | 8/2020 | Foster et al. | |
| 2021/0004265 A1 | 1/2021 | Bernat et al. | |
| 2022/0136722 A1 * | 5/2022 | Sharma | G05B 19/0421 |
| | | | 700/300 |
| 2022/0224121 A1 * | 7/2022 | Jha | G05B 13/0265 |
| 2022/0398515 A1 * | 12/2022 | McGuire | G06F 11/3428 |

OTHER PUBLICATIONS

Response to Communication Pursuant to Rules 161(1) and 162 EPC dated Oct. 17, 2023, from counterpart European Application No. 23724634.3, filed Apr. 17, 2024, 31 pp.

Boavizta, "Digital & environment : How to evaluate server manufacturing footprint, beyond greenhouse gas emissions?", Boavizta, Nov. 26, 2021, 25 pp., Retrieved from the Internet on Jul. 13, 2023 from URL: https://boavizta.org/en/blog/empreinte-de-la-fabrication-d-un-serveur.

Enerdata, "Between 10 and 20% of electricity consumption from the ICT* sector in 2030?", Enerdata, Aug. 9, 2018, 2 pp., Retrieved from the Internet on Jul. 13, 2023 from URL: https://www.enerdata.net/publications/executive- briefing/between-10-and-20-electricity-consumption-ict-sector-2030.html.

International Search Report and Written Opinion of International Application No. PCT/US2023/066161 dated Aug. 7, 2023, 14 pp.

Rozite et al., "Data Centres and Data Transmission Networks", IEA, Jul. 11, 2023, 12 pp., Retrieved from the Internet on Jul. 24, 2023 from URL: https://www.iea.org/energy-system/buildings/data-centres-and-data-transmission-networks.

Saravanan et al., "Power/Performance evaluation of Energy Efficient Ethernet (EEE) for High Performance Computing", 2013 IEEE International Symposium on Performance Analysis of Systems and Software, IEEE, Apr. 21, 2013, pp. 205-214, Retrieved from the Internet on Jul. 13, 2023 from URL: https://ieeexplore.ieee.org/document/6557171.

U.S. Appl. No. 18/305,181, filed Apr. 21, 2023, naming inventors Kommula et al.

Response to Extended Search Report dated Mar. 19, 2024, from counterpart European Application No. 23201078.5 filed Apr. 28, 2025, 24 pp.

Notice of Intent to Grant and Text Intended to Grant from counterpart European Application No. 23724634.3 dated Jul. 15, 2025, 51 pp.

* cited by examiner

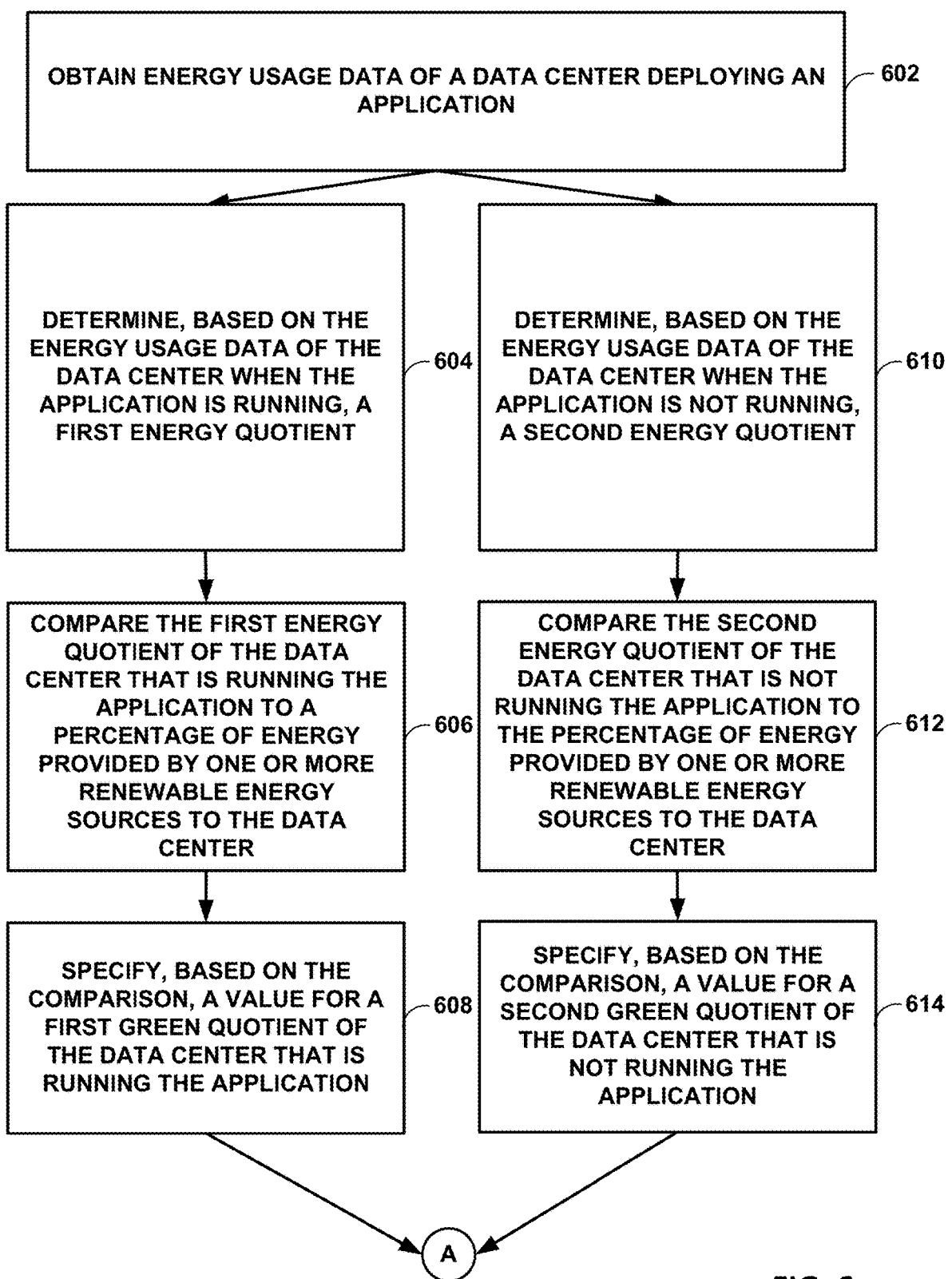

OBTAIN ENERGY USAGE DATA OF A DATA CENTER DEPLOYING AN APPLICATION — 602

DETERMINE, BASED ON THE ENERGY USAGE DATA OF THE DATA CENTER WHEN THE APPLICATION IS RUNNING, A FIRST ENERGY QUOTIENT — 604

DETERMINE, BASED ON THE ENERGY USAGE DATA OF THE DATA CENTER WHEN THE APPLICATION IS NOT RUNNING, A SECOND ENERGY QUOTIENT — 610

COMPARE THE FIRST ENERGY QUOTIENT OF THE DATA CENTER THAT IS RUNNING THE APPLICATION TO A PERCENTAGE OF ENERGY PROVIDED BY ONE OR MORE RENEWABLE ENERGY SOURCES TO THE DATA CENTER — 606

COMPARE THE SECOND ENERGY QUOTIENT OF THE DATA CENTER THAT IS NOT RUNNING THE APPLICATION TO THE PERCENTAGE OF ENERGY PROVIDED BY ONE OR MORE RENEWABLE ENERGY SOURCES TO THE DATA CENTER — 612

SPECIFY, BASED ON THE COMPARISON, A VALUE FOR A FIRST GREEN QUOTIENT OF THE DATA CENTER THAT IS RUNNING THE APPLICATION — 608

SPECIFY, BASED ON THE COMPARISON, A VALUE FOR A SECOND GREEN QUOTIENT OF THE DATA CENTER THAT IS NOT RUNNING THE APPLICATION — 614

SELF-LEARNING GREEN APPLICATION WORKLOADS

PRIORITY

This application claims the benefit of U.S. Provisional Patent Application No. 63/363,614, filed Apr. 26, 2022, the entire contents of which is incorporated herein by reference.

TECHNICAL FIELD

This disclosure relates to computer networks and, more specifically, to improving energy efficiency in computer networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage servers and application servers (compute nodes) are interconnected via high-speed switch fabric provided by one or more tiers of physical network switches and routers. More sophisticated data centers provide infrastructure spread throughout the world with subscriber support equipment located in various physical hosting facilities.

As data centers become larger, energy usage by the data centers increases. Some large data centers require a significant amount of power (e.g., around 100 megawatts), which is enough to power many homes (e.g., around 80,000). Data centers may also run application workloads that are compute and data intensive, such as crypto mining and machine learning applications, and consume a significant amount of energy. Customers of data centers and data center providers themselves are pushing for more energy efficient data centers and/or applications. To be more energy efficient, conventional data centers may source some of its energy from renewable energy sources. However, the configuration of data centers and/or the applications that run on the data centers are constantly changing and these conventional data centers are unable to dynamically increase its energy efficiency.

SUMMARY

In general, techniques are described for determining the energy usage of a data center and invoking one or more actions to improve the energy usage of the data center. For example, a computing system (e.g., controller) may obtain energy usage data of a data center, such as current power usage or capacity by devices within the data center. Based on the energy usage data, the computing system may determine a green quotient of the data center ($GQ_{dc}$) that indicates an energy usage of the data center in relation to energy provided by renewable energy sources to the data center, referred to herein as "green energy sources," such as solar, wind, hydroelectric, etc. The computing system may use the green quotient of the data center to determine whether the data center is energy efficient, and if the computing system determines that the data center is not energy efficient, the computing system may invoke (or cause another module to invoke) one or more actions to improve the energy usage of the data center.

Additionally, or alternatively, the computing system may determine the energy efficiency of an application workload deployed by the data center. For example, the computing system may obtain energy usage data of a data center that deploys an application. Based on the energy usage data, the computing system may determine a green quotient of an application ($GQ_{app}$) that indicates the energy usage of the data center deploying the application workload in relation to energy provided by renewable energy sources to the data center. The computing system may use the green quotient of the application to determine whether the data center deploying the application workload is energy efficient, and if the computing system determines that the data center deploying the application workload is not energy efficient, the computing system may invoke (or cause another module to invoke) one or more actions to improve the energy usage of the data center.

In one example, the techniques describe a method including obtaining energy usage data of a data center. The method also includes determining, based on a comparison of the energy usage data of the data center to a percentage of energy provided by one or more renewable energy sources to the data center, a green quotient of the data center that indicates whether the data center is energy efficient. The method further includes invoking, based on the green quotient of the data center indicating that the data center is not energy efficient, an action to improve energy usage of the data center.

In another example, the techniques describe a computing system including a memory and one or more processors in communication with the memory and configured to obtain energy usage data of a data center. The one or more processors are further configured to determine, based on a comparison of the energy usage data of the data center to a percentage of energy provided by one or more renewable energy sources to the data center, a green quotient of the data center that specifies a value that indicates whether the data center is energy efficient. The one or more processors are also configured to invoke, based on the green quotient of the data center that specifies a value that indicates the data center is not energy efficient, an action to improve energy usage of the data center.

In another example, the techniques describe a computer-readable medium having instructions that, when executed, cause one or more processors to obtain energy usage data of a data center. The instructions further cause the one or more processors to determine, based on a comparison of the energy usage data of the data center to a percentage of energy provided by one or more renewable energy sources to the data center, a green quotient of the data center that specifies a value that indicates whether the data center is energy efficient. The instructions also cause the one or more processors to invoke, based on the green quotient of the data center that specifies a value that indicates the data center is not energy efficient, an action to improve energy usage of the data center.

In one example, the techniques describe a method including obtaining energy usage data of a data center deploying an application. The method also includes determining, based on a comparison of the energy usage data of the data center deploying the application to a percentage of energy provided by one or more renewable energy sources to the data center, a green quotient of the application that specifies a value that indicates whether the data center deploying the application is energy efficient. The method further includes invoking, based on the green quotient of the application that specifies a value that indicates the data center deploying the application is not energy efficient, an action to improve energy usage of the data center deploying the application.

In another example, the techniques describe a computing system including a memory and one or more processors in communication with the memory and configured to obtain energy usage data of a data center deploying an application. The one or more processors are further configured to determine, based on a comparison of the energy usage data of the data center deploying the application to a percentage of energy provided by one or more renewable energy sources to the data center, a green quotient of the application that specifies a value that indicates whether the data center deploying the application is energy efficient. The one or more processors also configured to invoke, based on the green quotient of the application that specifies a value that indicates the data center is not energy efficient, an action to improve energy usage of the data center deploying the application.

In another example, the techniques describe a computer-readable medium having instructions that, when executed, cause one or more processors to obtain energy usage data of a data center deploying an application. The instructions further cause the one or more processors to determine, based on a comparison of the energy usage data of the data center deploying the application to a percentage of energy provided by one or more renewable energy sources to the data center, a green quotient of the application that specifies a value that indicates whether the data center deploying the application is energy efficient. The instructions also cause the one or more processors to invoke, based on the green quotient of the application that specifies a value that indicates the data center deploying the application is not energy efficient, an action to improve energy usage of the data center deploying the application.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
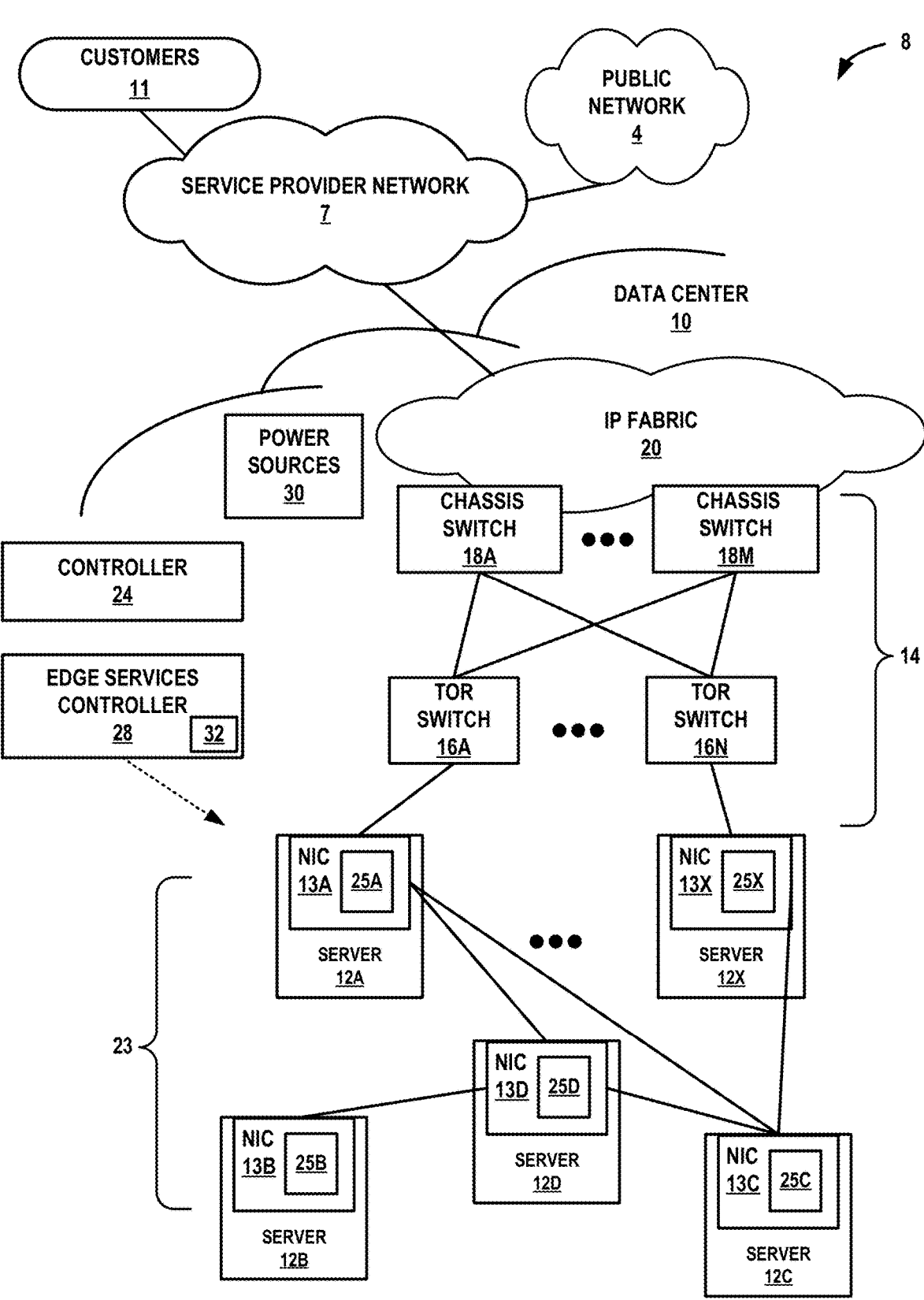
FIG. 1 is a block diagram illustrating an example network system having a data center in which examples of the techniques described herein may be implemented.

FIG. 1 is a block diagram illustrating an example system 8 having computing infrastructure in which examples of the techniques described herein may be implemented. In general, data center 10 provides an operating environment for applications and services for one or more customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 4, which may represent one or more networks administered by other providers, and may thus form part of a large-scale public network infrastructure, e.g., the Internet. Public network 4 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 4 are illustrated and described primarily as edge networks of service provider network 7, in some examples, one or more of customer sites 11 and public network 4 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 4. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack (TOR) switches 16A-16N. Servers 12 may also be referred to herein as "hosts" or "host devices." Data center 10 may include many additional servers coupled to other TOR switches 16 of the data center 10.

Switch fabric 14 in the illustrated example includes interconnected top-of-rack (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

Each of servers 12 may be a compute node, an application server, a storage server, or other type of server. For example, each of servers 12 may represent a computing device, such as an x86 processor-based server, configured to operate according to techniques described herein. Servers 12 may provide Network Function Virtualization Infrastructure (NFVI) for an NFV architecture.

Servers 12 host endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Servers 12 each includes at least one network interface card (NIC) of NICs 13A-13X (collectively, "NICs 13"), which each include at least one port with which to exchange packets send and receive packets over a communication link. For example, server 12A includes NIC 13A. NICs 13 provide connectivity between the server and the switch fabric. In some examples, NIC 13 includes an additional processing unit in the NIC itself to offload at least some of the processing from the host CPU (e.g., the CPU of the server that includes the NIC) to the NIC, such as for performing policing and other advanced functionality, known as the "datapath."

In some examples, each of NICs 13 provides one or more virtual hardware components for virtualized input/output (I/O). A virtual hardware component for I/O may be a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interface cards as "virtual functions" for use by respective endpoints executing on the server 12. In this way, the virtual network endpoints may share the same PCIe physical hardware resources and the virtual functions are examples of virtual hardware components. As another example, one or more servers 12 may implement Virtio, a para-virtualization framework available, e.g., for the Linux Operating System, that provides emulated NIC functionality as a type of virtual hardware component. As another example, one or more servers 12 may implement Open vSwitch to perform distributed virtual multilayer switching between one or more virtual NICs (vNICs) for hosted virtual machines, where such vNICs may also represent a type of virtual hardware component. In some instances, the virtual hardware components are virtual I/O (e.g., NIC) components. In some instances, the virtual hardware components are SR-IOV virtual functions and may provide SR-IOV with Data Plane Development Kit (DPDK)-based direct process user space access.

In some examples, including the illustrated example of FIG. 1, one or more of NICs 13 may include multiple ports. NICs 13 may be connected to one another via ports of NICs 13 and communications links to form a NIC fabric 23 having a NIC fabric topology. NIC fabric 23 is the collection of NICs 13 connected to at least one other NIC 13.

NICs 13 each includes a processing unit to offload aspects of the datapath. The processing unit in the NIC may be, e.g., a multi-core ARM processor with hardware acceleration provided by a Data Processing Unit (DPU), Field Programmable Gate Array (FPGA), and/or an ASIC. NICs 13 may alternatively be referred to as SmartNICs or GeniusNICs.

Figure 2:
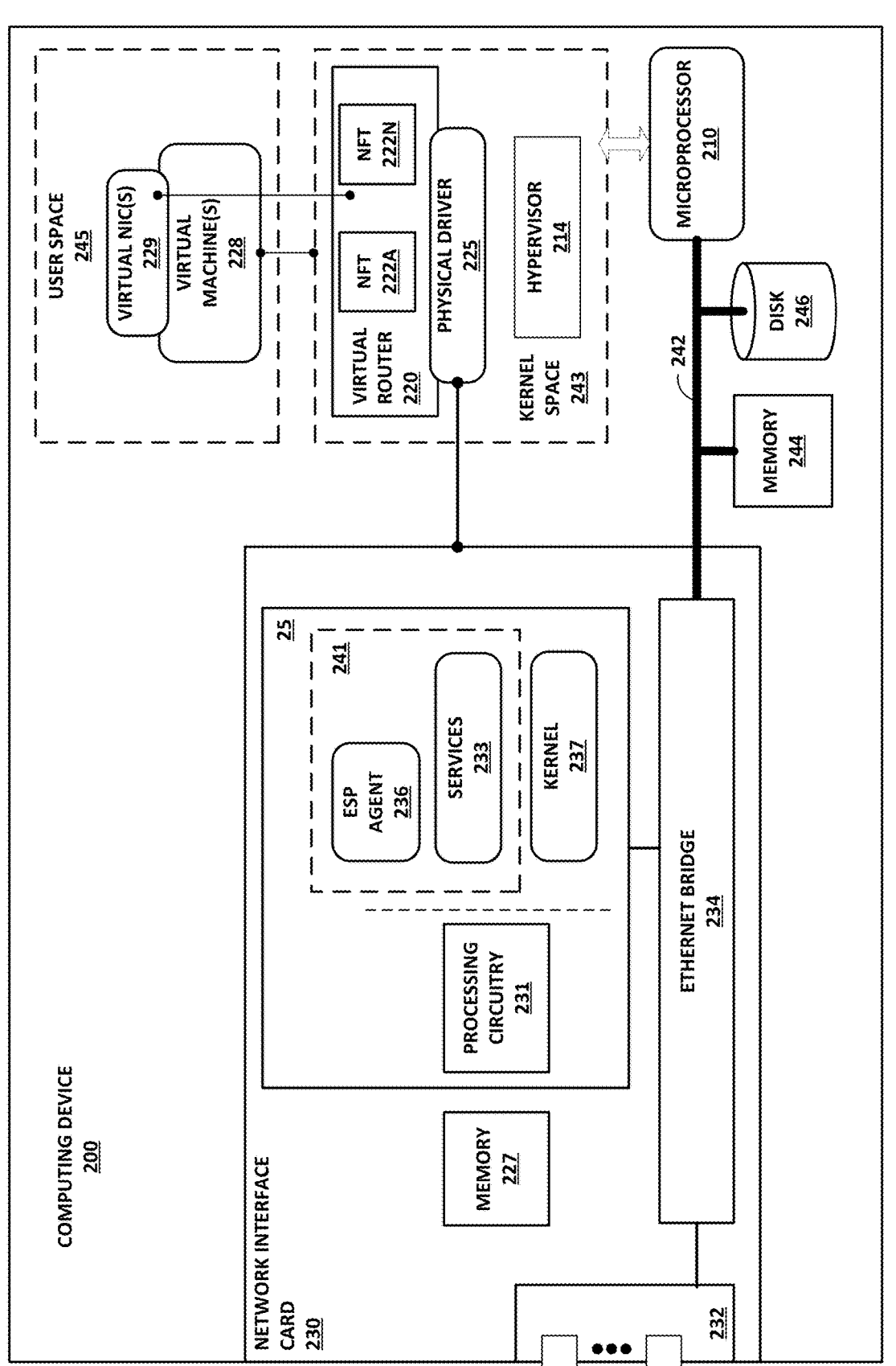
FIG. 2 is a block diagram illustrating an example computing device that uses a network interface card having a separate processing unit, to perform services managed by an edge services platform according to techniques described herein.

Edge services controller 28 may manage the operations of the edge services platform within NIC 13s in part by orchestrating services (e.g., services 233 as shown in FIG. 2) to be performed by processing units 25; API driven deployment of services 233 on NICs 13; NIC 13 addition, deletion and replacement within the edge services platform; monitoring of services 233 and other resources on NICs 13; and management of connectivity between various services 233 running on the NICs 13.

Edge services controller 28 may communicate information describing services available on NICs 13, a topology of NIC fabric 13, or other information about the edge services platform to an orchestration system (not shown) or network controller 24. Example orchestration systems include OpenStack, vCenter by VMWARE, or System Center by MICROSOFT. Example network controllers 24 include a controller for Contrail by JUNIPER NETWORKS or Tungsten Fabric. Additional information regarding a controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each of which is incorporated by reference as if fully set forth herein.

In accordance with one or more aspects of the techniques described in this disclosure, an edge services platform determines the energy efficiency of data center 10 and/or the energy efficiency of data center 10 when deploying an application workload, and may invoke one or more actions to improve energy efficiency of data center 10. In some examples, edge services controller 28 determines the energy efficiency of data center 10 and leverages processing units 25 of NICs 13 to augment the processing and network functionality of switch fabric 14 and/or servers 12 that include NICs 13 to improve energy efficiency of data center 10.

Self-Learning Green Networks

As one example, edge services controller 28 may include an energy efficiency module 32 configured to determine the energy efficiency of the data center, referred to herein as a green quotient of a data center ($GQ_{dc}$), based on energy usage of data center 10 in relation to a percentage of energy provided by one or more renewable energy sources to the data center (g) (also referred to herein as "green energy sources") such as solar, wind, hydroelectric, etc. In the example of FIG. 1, data center 10 may obtain energy from one or more power sources 30 for data center 10. Power sources 30 may include renewable energy sources, non-renewable energy sources, or a combination of renewable and non-renewable energy sources. Energy efficiency module 32 obtains telemetry data, including energy usage data of data center 10, which includes current energy usage ($E_C$) of data center 10 and total energy usage ($E_T$) of data center 10 if the data center is running at full capacity (e.g., determined from manufacturer provided information). Current energy usage data may include, for example, an amount of power currently used by one or more devices within the data center or other metric indicating energy currently being consumed. The total energy usage of data center 10 may indicate the maximum amount of power that can be used by the one or more devices if operating at maximum capacity. Energy efficiency module 32 may obtain energy usage data of data center 10 directly from servers 12 and/or network devices (e.g., chassis switches 18 and TOR switches 16) of data center 10, from a centralized controller that collects energy usage data from servers 12 and/or network devices of the data center, and/or from static information provided by manufacturers of the servers and/or network devices (e.g., maximum capacity of servers and/or compute nodes).

Energy efficiency module 32 determines a percentage of the total energy usage ($E_T$) consumed by the current energy usage ($E_C$) of data center 10, referred to herein as "energy quotient" ($E_Q$) of the data center, such as the following example below:

$$E_Q = \frac{E_C}{E_T} * 100$$

Energy efficiency module 32 compares the energy quotient ($E_Q$) of data center 10 with the percentage of energy provided by one or more renewable energy sources to the data center 10 (g) (referred to herein as "green energy percentage" of the data center). As an example of green energy percentage, if power sources 30 includes 20% renewable energy sources and 80% are non-renewable energy sources, the percentage of energy provided by one or more renewable energy sources to the data center 10 is 20%. Based on the comparison of the energy quotient ($E_Q$) with the green energy percentage (g) of data center 10, energy efficiency module 32 may specify a value for a green quotient of data center 10 ($GQ_{dc}$) that indicates whether data center 10 is energy efficient, such as shown in the example below.

$$GQ_{dc} = \begin{cases} 101 - 101^{\left(\frac{E_Q-g}{100-g}\right)}, & E_Q > g \\ 100, & E_Q \leq g \end{cases}$$

In this example, if the energy quotient ($E_Q$) of data center 10 is less than or equal to the green energy percentage (g) of data center 10 (e.g., $E_Q \leq g$), energy efficiency module 32 specifies a value (e.g., 100) for the green quotient of data center 10 ($GQ_{dc}$) that indicates that the energy usage by data center 10 is energy efficient (e.g., "green"). For example, if 20% of energy sources provided or allocated to data center 10 are from renewable energy sources, the value of 100 specified for the green quotient of the data center, indicates the energy usage by data center 10 does not exceed the 20% of renewable energy provided or allocated to data center 10. If the energy quotient ($E_Q$) of data center 10 is greater than the green energy percentage (g) of data center 10 (e.g., $E_Q > g$), energy efficiency module 32 specifies a value $$\left( e.g., \ 101 - 101^{\left(\frac{E_Q-g}{100-g}\right)} \right)$$

for the green quotient of data center 10 ($GQ_{dc}$) that indicates the energy usage by data center 10 is not energy efficient (e.g., "not green"). Continuing the example described above, if 20% of energy sources provided or allocated to data center 10 are from renewable energy sources, the value $$\left( e.g., \ 101 - 101^{\left(\frac{E_Q-g}{100-g}\right)} \right)$$

for the green quotient of data center 10 indicates the energy usage by data center 10 exceeds the amount of renewable energy provided or allocated to data center 10. As can be inferred from the formula, $GQ_{dc}$ increases exponentially as the renewable energy percentage goes up from g % to 100%.

Based on the green quotient of data center 10 ($GQ_{dc}$), energy efficiency module 32 may cause edge services controller 28 to invoke one or more actions to improve the energy usage of data center 10. For example, energy efficiency module 32 may, in response to determining that the green quotient of data center 10 is a value that indicates data center 10 is not energy efficient (e.g., not 100), cause edge services controller 28 to modify a network protocol implemented by devices within data center 10 to another network protocol that is more energy efficient (e.g., use less power). For instance, network devices, such as chassis switches 18 and TOR switches 16, and/or virtual routers implemented by servers 12 may use one or more network protocols in which certain network protocols may cause devices to consume more energy than other network protocols (e.g., by processing more data). In these examples, energy efficiency module 32 may, in response to determining that the green quotient of data center 10 is a value that indicates data center 10 is not energy efficient (e.g., not 100), cause edge services controller 28 to modify the network protocol implemented by virtual routers and/or physical network devices (e.g., switches 18 and TOR switches 16) in data center 10 (e.g., change the implementation of a first network protocol to a second network protocol that is more energy efficient than the first network protocol).

In some examples, energy efficiency module 32 may, in response to determining that the green quotient of data center 10 is a value that indicates data center 10 is not energy efficient (e.g., not 100), cause edge services controller 28 to modify a tunneling protocol implemented in the underlay network of the data center to another tunneling protocol that is more energy efficient. For example, physical and/or virtual network devices within data center 10 may perform encapsulation and/or de-capsulation of network packets to tunnel the network packets through the physical network infrastructure of data center 10. Certain tunneling protocols may cause devices to consume more energy than other tunneling protocols (e.g., by processing more data). In these examples, energy efficiency module 32 may, in response to determining that the green quotient of data center 10 is a value that indicates data center 10 is not energy efficient (e.g., not 100), cause edge services controller 28 to modify the tunneling protocol implemented by network devices in data center 10 (e.g., change the implementation of a first tunneling protocol to a second tunneling protocol that is more energy efficient than the first tunneling protocol).

In some examples, energy efficiency module 32 may, in response to determining that the green quotient of data center 10 is a value that indicates data center 10 is not energy efficient (e.g., not 100), cause edge services controller 28 to automatically scale port speeds of high-speed interfaces of one or more devices within data center 10. For example, NICs 13 may include one or more high speed interfaces configured to exchange packets using links of an underlying physical network. These interfaces may include a port interface card having one or more network ports. In these examples, energy efficiency module 32 may, in response to determining that the green quotient of data center 10 is a value that indicates data center 10 is not energy efficient (e.g., not 100), cause edge services controller 28 to automatically scale port speeds of high-speed interfaces of NICs 13.

In some examples in which the devices within data center 10 may implement high availability to provide redundancy and reliability for packet-based communications, energy efficiency module 32 may, in response to determining that the green quotient of data center 10 is a value that indicates data center 10 is not energy efficient (e.g., not 100), cause edge services controller 28 to reduce the number of duplicate and/or Equal-Cost Multi-Path (ECMP) paths used to provide high availability. In some examples in which high availability is disabled, energy efficiency module 32 may, in response to determining that the green quotient of data center 10 is a value that indicates data center 10 is not energy efficient (e.g., not 100), cause edge services controller 28 to shut down one or more network devices (e.g., half) that are configured to implement high availability.

In some examples, energy efficiency module 32 may, in response to determining that the green quotient of data center 10 is a value that indicates data center 10 is not energy efficient (e.g., not 100), cause edge services controller 28 to proactively activate a cooling system of the data center. In some examples, edge services controller 28 may activate a cooling system of the data center prior to the temperature of the data center exceeding a configured temperature threshold that automatically activates the cooling system of the data center.

In some examples, energy efficiency module 32 may, in response to determining that the green quotient of data center 10 is a value that indicates data center 10 is not energy efficient (e.g., not 100), cause edge services controller 28 to automatically scale a packet size (e.g., maximum transmission unit (MTU) size) of packets. For example, the payload size in each packet may influence energy usage. For example, a smaller MTU size of packets may result in the generation of more packets, which may increase energy usage. In these examples, energy efficiency module 32 may, in response to determining that the green quotient of data center 10 is a value that indicates data center 10 is not energy efficient (e.g., not 100), cause edge services controller 28 to automatically scale the MTU size of packets.

The above actions are merely examples. Energy efficiency module 32 may perform other actions, such as alerting an administrator that data center 10 is not energy efficient and, in some example, provide a recommended action to reduce the energy consumption by data center 10.

Self-Learning Green Workloads

As another example, energy efficiency module 32 is configured to determine the energy efficiency of an application workload deployed by data center 10, referred to herein as a green quotient of an application ($GQ_{app}$). In these examples, energy efficiency module 32 obtains telemetry data, including energy usage data of data center 10, and based on the energy usage data, determines the green quotient of data center 10 when the application is running ($GQ_{dc2}$) that indicates the energy efficiency of data center 10 when the application is running, and determines the green quotient of data center 10 when the application is not running ($GQ_{dc1}$) that indicates the energy efficiency of data center 10 when the application is not running. The green quotient of data center 10 when the application is not running may represent the energy efficiency of a stable data center 10. As described above, energy efficiency module 32 may determine the green quotient of the data center based on a computation of the "energy quotient" ($E_Q$) of the data center. In this example, energy efficiency module 32 may compute the "energy quotient" ($E_Q$) of data center 10 when the application is not running. For example, energy efficiency module 32 may determine a percentage of the total energy usage ($E_T$) consumed by the current energy usage ($E_C$) of data center 10 when the application is not running, and determine the green quotient of the data center when the application is not running ($GQ_{dc1}$) based on a computation of the "energy quotient" ($E_Q$) of data center 10 when the application is not running. Energy efficiency module 32 may also determine a percentage of the total energy usage ($E_T$) consumed by the current energy usage ($E_C$) of data center 10 when the application is running, and determine the green quotient of the data center when the application is running ($GQ_{dc2}$) based on a computation of the "energy quotient" ($E_Q$) of data center 10 when the application is running. In some examples, the green quotient of the data center when the application is running ($GQ_{dc2}$) may represent an average of green quotients computed for data center 10 when the application is running over a period of time.

Energy efficiency module 32 computes a delta ($GQ_Δ$) of the green quotient of data center 10 when the application is running ($GQ_{dc2}$) and the green quotient of data center 10 when the application is not running ($GQ_{dc1}$) to determine the energy usage of the application, as shown in the example below.

$$GQ_Δ = GQ_{dc2} - GQ_{dc1}$$

Energy efficiency module 32 then compares the energy usage of the application (e.g., $GQ_Δ$) with the green energy percentage (g) of data center 10, and based on that comparison, specifies a value for green quotient of the application ($GQ_{app}$) that indicates whether data center 10 deploying the application is energy efficient, such as shown in the example below.

$$GQ_{app} = \begin{cases} GQ_\Delta, & GQ_\Delta > g \\ 100, & GQ_\Delta \leq g \end{cases}$$

In this example, if the energy usage of the application is less than or equal to the green energy percentage of data center 10 (e.g., $GQ_\Delta \leq g$), energy efficiency module 32 specifies a value (e.g., 100) for the green quotient of the application ($GQ_{app}$) that indicates data center 10 deploying the application is energy efficient. For example, if 20% of energy sources provided or allocated to data center 10 are from renewable energy sources, the value of 100 specified for the green quotient of the application indicates the energy usage by data center 10 that deploys the application does not exceed the 20% of renewable energy provided or allocated to data center 10. If the energy usage of the application is greater than the percentage of energy provided by one or more renewable energy sources to the data center (e.g., $GQ_\Delta > g$), energy efficiency module 32 specifies a value (e.g., $GQ_\Delta$) for the green quotient of the application ($GQ_{app}$) that indicates data center 10 deploying the application is not energy efficient. Continuing the example described above, if 20% of energy sources provided or allocated to data center 10 are from renewable energy sources, the value of not 100 specified for the green quotient of the application indicates the energy usage by data center 10 that deploys the application exceeds the 20% of renewable energy provided or allocated to data center 10.

Based on the green quotient of the application ($GQ_{app}$), energy efficiency module 32 may cause edge services controller 28 to invoke one or more actions to improve the energy usage of data center 10 deploying the application. In some examples, energy efficiency module 32 may, in response to determining that the green quotient of the application is a value that indicates data center 10 is not energy efficient (e.g., not 100), cause edge services controller 28 to automatically deploy application workloads to one or more select servers to reduce energy consumption by data center 10. For example, certain servers 12 may consume more energy due to being overloaded with application workloads. In these examples, energy efficiency module 32 may, in response to determining that the green quotient of the application is a value that indicates data center 10 is not energy efficient (e.g., not 100), cause edge services controller 28 to automatically deploy application workloads to select servers 12 or deploy the application workloads in a way to reduce energy consumption by data center 10 (e.g., by not deploying the application workloads to servers that are currently consuming more energy).

In some examples, energy efficiency module 32 may, in response to determining that the green quotient of the application is a value that indicates data center 10 is not energy efficient (e.g., not 100), cause edge services controller 28 to migrate application workloads to fewer servers and shutdown remaining unused servers. For example, application workloads may be deployed on a plurality of servers 12, e.g., servers 12A-12C. In these examples, energy efficiency module 32 may, in response to determining that the green quotient of the application is a value that indicates data center 10 is not energy efficient (e.g., not 100), cause edge services controller 28 to migrate application workloads to fewer servers, e.g., servers 12A and 12B, and shutdown remaining unused servers, e.g., server 12C.

In some examples, energy efficiency module 32 may, in response to determining that the green quotient of the application is a value that indicates data center 10 is not energy efficient (e.g., not 100), cause edge services controller 28 to activate the cooling system. In some examples, edge services controller 28 may proactively activate the cooling system of the data center prior to the temperature of data center 10 exceeding a configured temperature threshold.

In some examples, energy efficiency module 32 may, in response to determining that the green quotient of the application is not energy efficient (e.g., not 100), cause edge services controller 28 to disable the scaling of applications if the energy usage of the application exceeds a configured threshold. For example, application workloads may be deployed on a plurality of servers 12. The deployment of additional application workloads on servers 12 may cause data center 10's energy usage to not be energy efficient. In these examples, energy efficiency module 32 may, in response to determining that the green quotient of the application is a value that indicates data center 10 is not energy efficient (e.g., not 100), cause edge services controller 28 to disable scaling of application workloads on servers 12.

In some examples, customers may prefer performance over energy efficiency of data center 10 or vice versa. In these examples, customers may specify requirements when the green quotient of the application exceeds a configured threshold. For example, one or more servers 12 may run a crypto mining application. In this example, a customer may specify a configured threshold for certain applications that enables data center 10 to operate with less energy efficiency to allow for higher performance. In this example, the customer may specify requirements to invoke one or more actions to improve the energy usage of data center 10 only if the green quotient of the application ($GQ_{app}$) exceeds the configured threshold. In this way, the customer may specify requirements to control whether the data center 10 is to be more energy efficient or to have more performance.

The above actions are merely examples. Energy efficiency module 32 may perform other actions, such as alerting an administrator that data center 10 deploying the application workload is not energy efficient and, in some example, provide a recommended action to reduce the energy consumption by data center 10.

Self-Learning Green Data Centers

In some examples, energy efficiency module 32 may determine a pattern to the energy usage of data center 10 and/or one or more applications running on data center 10. For example, energy efficiency module 32 may implement one more machine learning models (e.g., supervised learning, unsupervised learning, or other machine learning models) to determine a pattern to data center 10's energy usage and/or pattern to the application's energy usage that repeatedly exceeds the green energy percentage (g) of data center 10. Based on the determined pattern, energy efficiency module 32 may cause edge services controller 28 to invoke one or more actions to improve the energy usage of data center 10 and/or the application before data center 10 becomes less energy efficient (e.g., before the green quotient of data center 10 ($GQ_{dc}$) or green quotient of the application ($GQ_{app}$) is specified with a value that is not 100). In some examples, energy efficiency module 32 may cause edge services controller 28 to pre-set a cooling system of the data center to activate prior to the temperature of the data center exceeding a configured temperature threshold. For example, energy efficiency module 32 may determine that a particular application running on servers 12A-12C may repeatedly cause the temperature of data center 10 to rise above the configured temperature threshold. In this example, energy efficiency module 32 may cause edge services controller 28 to pre-set the cooling system to activate when the application starts running on servers 12A-12C prior to the temperature of data center 10 rising above the configured temperature threshold.

In some examples, energy efficiency module 32 may cause edge services controller 28 to proactively migrate applications to less servers. For example, energy efficiency module 32 may determine that any application running on servers 12A-12C may repeatedly cause the energy usage of data center 10 to exceed the green energy percentage of data center 10. In this example, energy efficiency module 32 may cause edge services controller 28 to migrate the application workload to less servers, e.g., servers 12A and 12B, prior to running the application on servers 12 of data center 10.

FIG. 2 is a block diagram illustrating an example computing device that uses a network interface card having a separate processing unit, to perform services managed by an edge services platform according to techniques described herein. Computing device 200 of FIG. 2 may represent a real or virtual server and may represent an example instance of any of servers 12 of FIG. 1. Computing device 200 includes in this example, a bus 242 coupling hardware components of a computing device 200 hardware environment. Bus 242 couples SR-IOV-capable network interface card (NIC) 230, storage disk 246, and microprocessor 210. A front-side bus may in some cases couple microprocessor 210 and memory device 244. In some examples, bus 242 may couple memory device 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit ("processing core") to perform instructions that conform to an instruction set architecture. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 also include an on-card memory 227 to, e.g., store packet data. Direct memory access transfers between the NIC 230 and other devices coupled to bus 242 may read/write from/to the memory 227.

Memory 244, NIC 230, storage disk 246, and microprocessor 210 provide an operating environment for a software stack that executes a hypervisor 214 and one or more virtual machines 228 managed by hypervisor 214.

In general, a virtual machine provides a virtualized/guest operating system for executing applications in an isolated virtual environment. Because a virtual machine is virtualized from physical hardware of the host server, executing applications are isolated from both the hardware of the host and other virtual machines.

An alternative to virtual machines is the virtualized container, such as those provided by the open-source DOCKER Container application. Like a virtual machine, each container is virtualized and may remain isolated from the host machine and other containers. However, unlike a virtual machine, each container may omit an individual operating system and provide only an application suite and application-specific libraries. A container is executed by the host machine as an isolated user-space instance and may share an operating system and common libraries with other containers executing on the host machine. Thus, containers may require less processing power, storage, and network resources than virtual machines. As used herein, containers may also be referred to as virtualization engines, virtual private servers, silos, or jails. In some instances, the techniques described herein with respect to containers and virtual machines or other virtualization components.

While virtual network endpoints in FIG. 2 are illustrated and described with respect to virtual machines, other operating environments, such as containers (e.g., a DOCKER container) may implement virtual network endpoints. An operating system kernel (not shown in FIG. 2) may execute in kernel space and may include, for example, a Linux, Berkeley Software Distribution (BSD), another Unix-variant kernel, or a Windows server operating system kernel, available from MICROSOFT.

Computing device 200 executes a hypervisor 214 to manage virtual machines 228. Example hypervisors include Kernel-based Virtual Machine (KVM) for the Linux kernel, Xen, ESXi available from VMWARE, Windows Hyper-V available from MICROSOFT, and other open-source and proprietary hypervisors. Hypervisor 214 may represent a virtual machine manager (VMM).

Virtual machines 228 may host one or more applications, such as virtual network function instances. In some examples, a virtual machine 228 may host one or more VNF instances, where each of the VNF instances is configured to apply a network function to packets.

Hypervisor 214 includes a physical driver 225 to use the physical function 221 provided by network interface card 230. In some cases, network interface card 230 may also implement SR-IOV to enable sharing the physical network function (I/O) among virtual machines 224. Each port of NIC 230 may be associated with a different physical function. The shared virtual devices, also known as virtual functions, provide dedicated resources such that each of virtual machines 228 (and corresponding guest operating systems) may access dedicated resources of NIC 230, which therefore appears to each of virtual machines 224 as a dedicated NIC. Virtual functions 217 may represent lightweight PCIe functions that share physical resources with the physical function 221 and with other virtual functions 216. NIC 230 may have thousands of available virtual functions according to the SR-IOV standard, but for I/O-intensive applications the number of configured virtual functions is typically much smaller.

Virtual machines 228 include respective virtual NICs 229 presented directly into the virtual machine 228 guest operating system, thereby offering direct communication between NIC 230 and the virtual machine 228 via bus 242, using the virtual function assigned for the virtual machine. This may reduce hypervisor 214 overhead involved with software-based, VIRTIO and/or vSwitch implementations in which hypervisor 214 memory address space of memory 244 stores packet data and packet data copying from the NIC 230 to the hypervisor 214 memory address space and from the hypervisor 214 memory address space to the virtual machines 228 memory address space consumes cycles of microprocessor 210.

NIC 230 may further include a hardware-based Ethernet bridge or embedded switch 234. Ethernet bridge 234 may perform layer 2 forwarding between virtual functions and physical functions of NIC 230. Bridge 234 thus in some cases provides hardware acceleration, via bus 242, of inter-virtual machine 224 packet forwarding and of packet forwarding between hypervisor 214, which accesses the physical function via physical driver 225, and any of virtual machines 224. The embedded switch 234 may be physically separate from processing unit 25.

Computing device 200 may be coupled to a physical network switch fabric that includes an overlay network that extends switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. At least some functions of virtual router may be performed as one of services 233.

In the example computing device 200 of FIG. 2, virtual router 220 executes within hypervisor 214 that uses physical function 221 for I/O, but virtual router 220 may execute within a hypervisor, a host operating system, a host application, one of virtual machines 228, and/or processing unit 25 of NIC 230.

In general, each virtual machine 228 may be assigned a virtual address for use within a corresponding virtual network, where each of the virtual networks may be associated with a different virtual subnet provided by virtual router 220. A virtual machine 228 may be assigned its own virtual layer three (L3) IP address, for example, for sending and receiving communications but may be unaware of an IP address of the computing device 200 on which the virtual machine is executing. In this way, a "virtual address" is an address for an application that differs from the logical address for the underlying, physical computer system, e.g., computing device 200.

In one implementation, computing device 200 includes a virtual network (VN) agent (not shown) that controls the overlay of virtual networks for computing device 200 and that coordinates the routing of data packets within computing device 200. In general, a VN agent communicates with a virtual network controller for the multiple virtual networks, which generates commands to control routing of packets. A VN agent may operate as a proxy for control plane messages between virtual machines 228 and virtual network controller, such as controller 24. For example, a virtual machine may request to send a message using its virtual address via the VN agent, and VN agent may in turn send the message and request that a response to the message be received for the virtual address of the virtual machine that originated the first message. In some cases, a virtual machine 228 may invoke a procedure or function call presented by an application programming interface of VN agent, and the VN agent may handle encapsulation of the message as well, including addressing.

In one example, network packets, e.g., layer three (L3) IP packets or layer two (L2) Ethernet packets generated or consumed by the instances of applications executed by virtual machine 228 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc.

As noted above, a virtual network controller may provide a logically centralized controller for facilitating operation of one or more virtual networks. The virtual network controller may, for example, maintain a routing information base, e.g., one or more routing tables that store routing information for the physical network as well as one or more overlay networks. Virtual router 220 of hypervisor 214 implements a network forwarding table (NFT) 222A-222N for N virtual networks for which virtual router 220 operates as a tunnel endpoint. In general, each NFT 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of NFTs 222 may be an NFT for a different routing instance (not shown) implemented by virtual router 220.

An edge services platform leverages processing unit 25 of NIC 230 to augment the processing and networking functionality of computing device 200. Processing unit 25 includes processing circuitry 231 to execute services orchestrated by edge services controller 28. Processing circuitry 231 may represent any combination of processing cores, ASICs, FPGAs, or other integrated circuits and programmable hardware. In an example, processing circuitry may include a System-on-Chip (SoC) having, e.g., one more cores, a network interface for high-speed packet processing, one or more acceleration engines for specialized functions (e.g., security/cryptography, machine learning, storage), programmable logic, integrated circuits, and so forth. Such SoCs may be referred to as data processing units (DPUs). DPUs may be examples of processing unit 25.

In the example NIC 230, processing unit 25 executes an operating system kernel 237 and a user space 241 for services. Kernel may be a Linux kernel, a Unix or BSD kernel, a real-time OS kernel, or other kernel for managing hardware resources of processing unit 25 and managing user space 241.

Services 233 may include network, security, storage, data processing, co-processing, machine learning or other services, such as energy efficiency services, in accordance with techniques described in this disclosure. Processing unit 25 may execute services 233 and edge service platform (ESP) agent 236 as processes and/or within virtual execution elements such as containers or virtual machines. As described elsewhere herein, services 233 may augment the processing power of the host processors (e.g., microprocessor 210) by, e.g., enabling the computing device 200 to offload packet processing, security, or other operations that would otherwise be executed by the host processors.

Processing unit 25 executes edge service platform (ESP) agent 236 to exchange data and control data with an edge services controller for the edge service platform. While shown in user space 241, ESP agent 236 may be a kernel module 237 in some instances.

As an example, ESP agent 236 may collect and send, to the ESP controller, telemetry data generated by services 233, the telemetry data describing traffic in the network, computing device 200 or network resource availability, resource availability of resources of processing unit 25 (such as memory or core utilization), and/or resource energy usage. As another example, ESP agent 236 may receive, from the ESP controller, service code to execute any of services 233, service configuration to configure any of services 233, packets or other data for injection into the network.

Edge services controller 28 manages the operations of processing unit 25 by, e.g., orchestrating and configuring services 233 that are executed by processing unit 25; deploying services 233; NIC 230 addition, deletion and replacement within the edge services platform; monitoring of services 233 and other resources on NIC 230; and management of connectivity between various services 233 running on NIC 230. Example resources on NIC 230 include memory 227 and processing circuitry 231. In some examples, edge services controller 28 may invoke one or more actions to improve energy usage of data center 10 via managing the operations of processing unit 25. In some examples, edge services controller 28 may set a target green quotient for processing unit 25 that causes processing unit 25 to select or adjust a particular routing or tunnel protocol, particular algorithm, MTU size, interface, and/or any of services 233.

Figure 3:
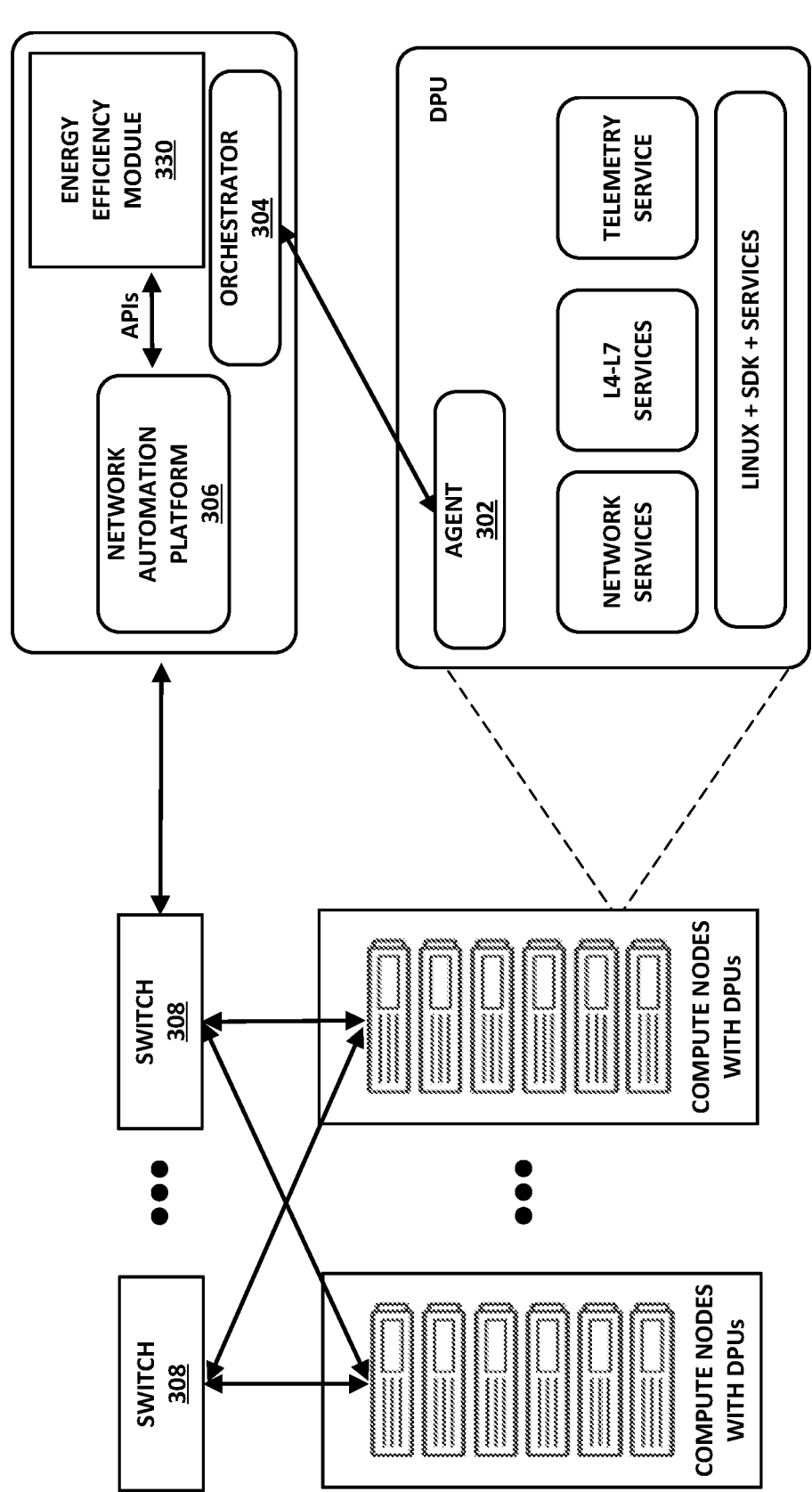
FIG. 3 is a conceptual diagram illustrating a data center with servers that each include a network interface card having a separate processing unit, controlled by an edge services platform, according to techniques described in this disclosure.

FIG. 3 is a conceptual diagram illustrating a data center with servers that each include a network interface card having a separate processing unit, controlled by an edge services platform, according to techniques described in this disclosure. Racks of compute nodes may correspond to servers 12 of FIG. 1, and switches 308 may correspond to the switches of fabric 14 of FIG. 1. An agent 302 or orchestrator 304 represents software executed by the processing unit (illustrated in FIG. 3 as a data processing unit or DPU) and receives configuration information for the processing unit and sends telemetry and other information for the NIC that includes the processing unit to orchestrator

304. Network services, L4-L7 services, and telemetry service, such as a telemetry exporter 312, may represent examples of services 233. Orchestrator 304 may represent an example of edge services controller 28 of FIG. 1.

Network automation platform 306 connects to and manages network devices and orchestrator 304, by which network automation platform 306 can utilize the edge services platform. Network automation platform 306 may, for example, deploy network device configurations, manage the network, extract telemetry, and analyze and provide indications of the network status.

Energy efficiency module 330 may represent an example instance of energy efficiency module 32 of FIG. 1. In some examples, energy efficiency module 330 may, based on a determination that the green quotient of data center 10 ($GQ_{dc}$) is a value that indicates data center is not energy efficient (e.g., not 100), instruct network automation platform 306 to manage network device configurations, such as modifying network protocols implemented by network devices, modify tunneling protocols implemented by network devices, scale port speeds, scale MTU size of packets, reduce the number of duplicate/ECMP paths for high availability, disable network devices if high availability is disabled, etc. In some examples, energy efficiency module 330 may instruct network automation platform 306 to manage cooling systems to proactively activate cooling systems and/or pre-set the configuration of the cooling systems. In some examples, energy efficiency module 330 may, based on a determination that the green quotient of data center 10 ($GQ_{dc}$) or green quotient of an application running on data center 10 ($GQ_{app}$) is a value indicating data center 10 is not energy efficient (e.g., not 100), instruct network automation platform 306 to manage network device configurations, such as managing the deployment of application workloads (e.g., migrate application workloads to fewer hosts and disabling unused hosts, disabling workload scaling).

Figure 4:
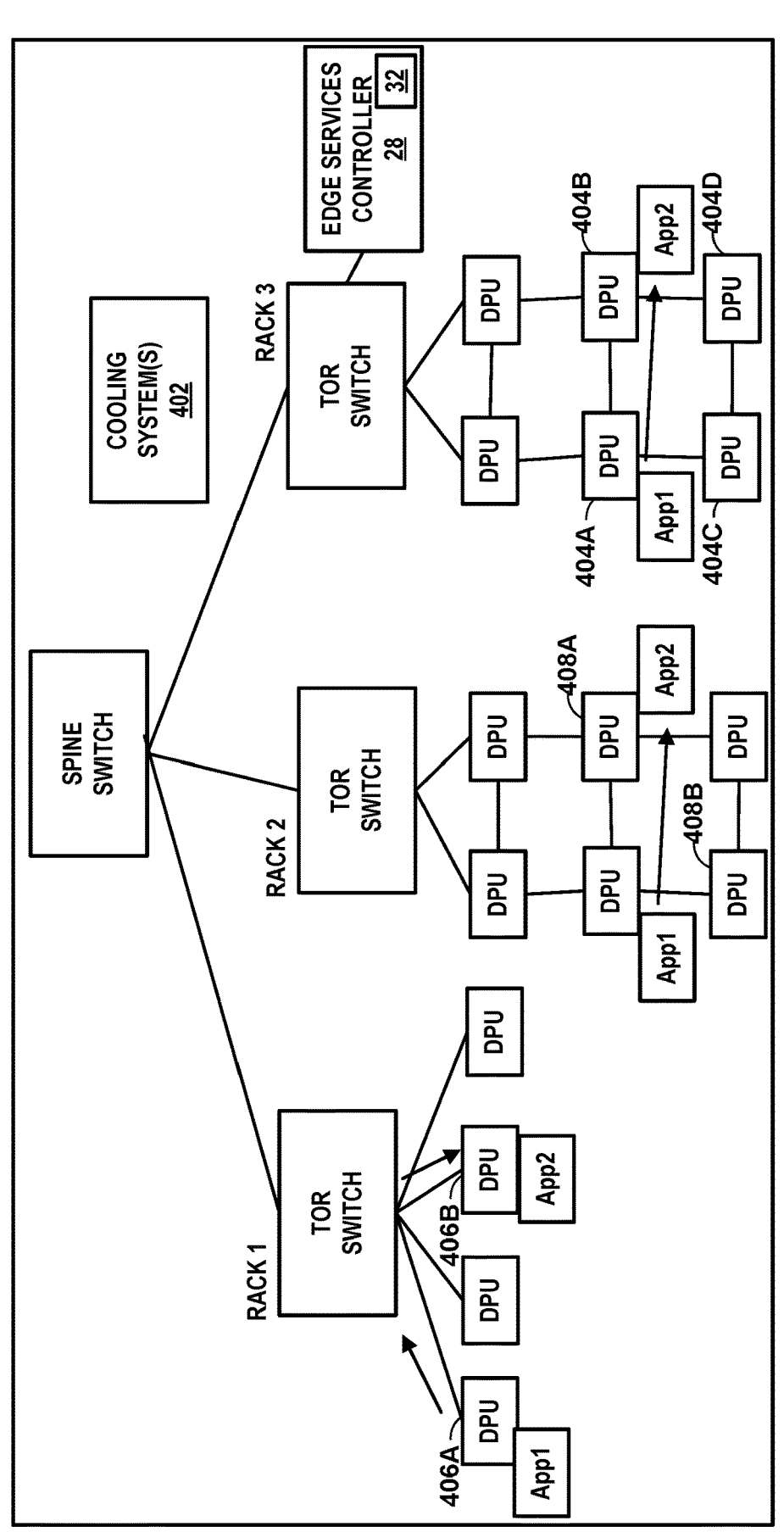
FIG. 4 illustrates an example application of the edge services platform, in accordance with the techniques described in this disclosure.

FIG. 4 is a diagram illustrating data center having server connected by a switch fabric, with NICs forming independent NIC fabrics. The servers are not shown in FIG. 4. Edge services controller 28 may manage one or more data centers, but more ease of illustration, edge services controller 28 is managing a single data center in FIG. 4. FIG. 4 illustrates an example of three different kinds of connectivity between NICs and TORs in each rack. Rack 1 illustrates a traditional datacenter connectivity. In this example, every NIC is directly connected to a TOR port. In this configuration, applications, e.g., App1 and App2, can only communicate through TOR, thus increasing latency. Rack 2 illustrates a connectivity in which application latency optimized connectivity. In this example, some NICs are connected to TOR while the remaining NICs have indirect connectivity to TORs. In this example, applications, e.g., App1 and App2, can directly communicate with each other (through back-to-back NIC connection). Rack 3 is similar in connectivity as Rack 2 (e.g., some NICs connected to TOR while remaining NICs have indirect connectivity to TORs) but with the addition of high availability using multiple connections between NICs.

As one example, energy efficiency module 32 of edge services controller 28 may compute a green quotient of the data center and determine that the green quotient of the data center is a value that indicates the data center is not energy efficient (e.g., not 100). In this example, energy efficiency module 32 may, in response to determining that the green quotient of the data center is a value that indicates the data center is not energy efficient, instruct edge services controller 28 to manage network device configurations in Rack 3 to reduce the number of duplicate and/or Equal-Cost Multi-Path (ECMP) paths used to provide high availability. For example, edge services controller 28 may send instructions to agents 302 executed by the processing unit of NICs 404A and 404B to reduce the number of duplicate and/or ECMP paths used to provide high availability. In some examples in which high availability is disabled, energy efficiency module 32 may, in response to determining that the green quotient of the data center is a value that indicates the data center is not energy efficient, cause edge services controller 28 to shut down one or more network devices (e.g., half) that are configured to implement high availability, e.g., network devices including NICs 404C and 404D.

As another example, energy efficiency module 32 may, in response to determining that the green quotient of the data center is a value that indicates the data center is not energy efficient, instruct edge services controller 28 to manage network device configurations in Rack 1 to modify the tunneling protocol implemented by NICs in Rack 1 to implement a different tunneling protocol that is more energy efficient, e.g., NICs 406A and 406B.

As another example, energy efficiency module 32 may, in response to determining that the green quotient of the data center is a value that indicates the data center is not energy efficient, instruct edge services controller 28 to manage one or more cooling systems 402 of the data center to proactively activate cooling systems 402 and/or pre-set configurations for cooling systems 402.

As another example, energy efficiency module 32 may, in response to determining that the green quotient of the application is a value that indicates the data center is not energy efficient, instruct edge services controller 28 to manage the deployment of application workloads in Rack 2. For example, edge services controller 28 may deploy App2 in a different server, such as the server including NIC 408B, and manage the network device configurations to enable NIC 408B to send and receive packets for App2.

Figure 5:
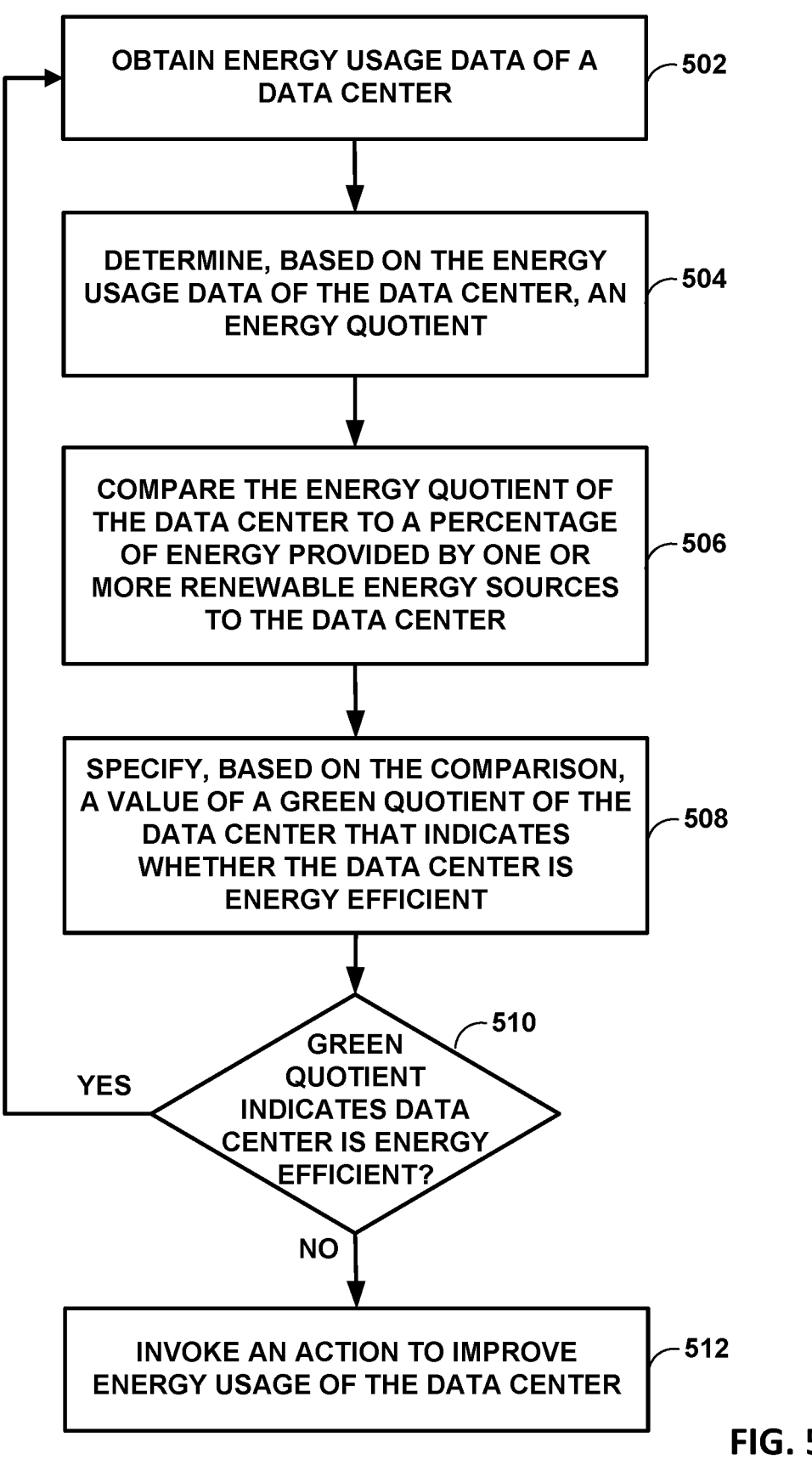
FIG. 5 is a flow chart of an example operation of edge services controller to provide self-learning green networks, in accordance with the techniques described in this disclosure.

FIG. 5 is a flow chart of an example operation of edge services controller 28 to provide self-learning green networks, in accordance with the techniques described in this disclosure. In the example of FIG. 5, energy efficiency module 32 of edge services controller 28 may determine a green quotient of the data center and invoke one or more actions based on the green quotient of the data center to improve energy usage of the data center.

For example, energy efficiency module 32 of edge services controller 28 may obtain energy usage data of a data center (502). The energy usage data may comprise a current energy usage ($E_C$) of the data center and a total energy usage ($E_T$) of the data center if the data center were to run at full capacity. As one example, edge services controller 28 may obtain energy usage data from edge service platform (ESP) agents (e.g., ESP agent 236 of FIG. 2) of computing devices (e.g., computing device 200 of FIG. 2) that specifies the current energy usage of computing devices within the data center. In some examples, edge services controller 28 may obtain total energy usage data from information provided by manufacturers of computing devices within the data center, such as manufacturer provided documentation specifying maximum energy capacity of the computing devices.

Energy efficiency module 32 of edge services controller 28 may determine, based on the energy usage data of the data center, an energy quotient ($E_Q$) of the data center that indicates a percentage of the total energy usage of the data center consumed by the current energy usage of the data center (504). Energy efficiency module 32 of edge services controller 28 may compare the energy quotient of the data center to a percentage of energy provided by one or more renewable energy sources to the data center, e.g., green energy percentage (g) (506).

Based on the comparison of the energy quotient ($E_Q$) with the green energy percentage (g) of the data center, energy efficiency module 32 of edge services controller 28 may specify a value of a green quotient of the data center ($GQ_{dc}$) that indicates whether the data center is energy efficient (508). For example, if the energy quotient ($E_Q$) of the data center is less than or equal to the green energy percentage (g) of the data center (e.g., $E_Q \leq g$), energy efficiency module 32 specifies a value (e.g., 100) for the green quotient of the data center ($GQ_{dc}$) that indicates the data center is energy efficient (e.g., "green"). If the energy quotient ($E_Q$) of the data center is greater than the green energy percentage (g) of the data center (e.g., $E_Q > g$), energy efficiency module 32 specifies a value $$\left( \text{e.g., } 101 - 101^{\left(\frac{E_Q - g}{100 - g}\right)} \right)$$

for the green quotient of the data center ($GQ_{dc}$) that indicates the data center is not energy efficient (e.g., "not green").

If the green quotient of the data center indicates the data center is not energy efficient ("NO" of step 510), energy efficiency module 32 may cause edge services controller 28 to invoke one or more actions to improve energy usage of the data center (512). For example, energy efficiency module 32 may, in response to determining the green quotient of the data center that indicates the data center is not green, cause edge services controller 28 to modify a network protocol implemented by devices within the data center to another network protocol that is more energy efficient (e.g., use less power), modify a tunneling protocol implemented in the underlay network of the data center to another tunneling protocol that is more energy efficient, automatically scale port speeds of high-speed interfaces of devices within the data center, reduce the number of duplicate and/or Equal-Cost Multi-Path (ECMP) paths used to provide high availability, shut down one or more network devices (e.g., half) that are configured to implement high availability when high availability is disabled, proactively activate a cooling system of the data center prior to the temperature of the data center exceeding a configured temperature threshold, automatically scale the MTU size of packets, or other actions to improve the energy usage of the data center.

If the green quotient of the data center indicates the data center is energy efficient ("YES" of step 510), energy efficiency module 32 may restart the process (e.g., at step 502) to determine whether the data center is energy efficient or stop the process.

Figure 6:
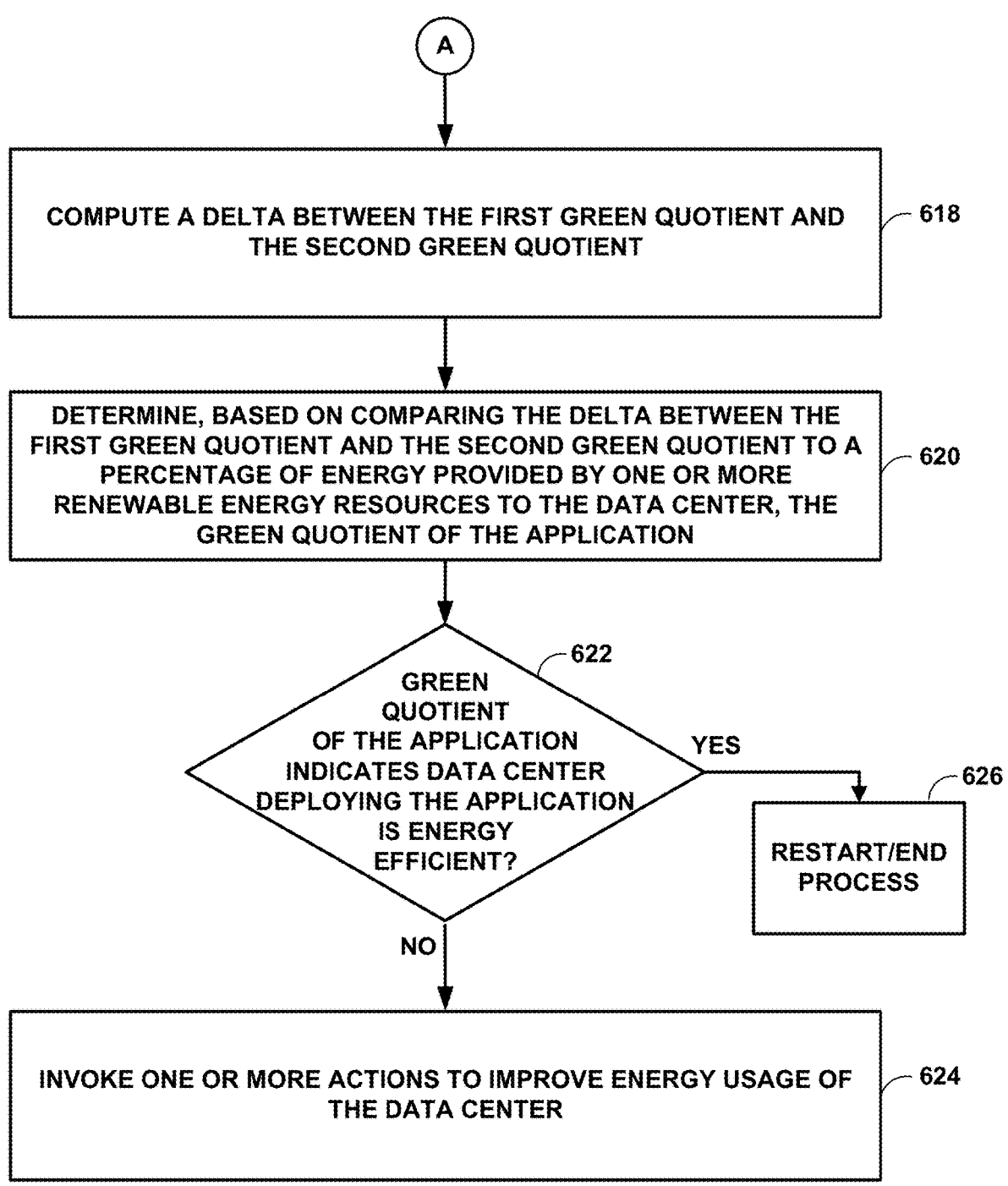
FIG. 6 is a flow chart of another example operation of edge services controller to provide self-learning application workloads, in accordance with the techniques described in this disclosure.

FIG. 6 is a flow chart of an example operation of edge services controller 28 to provide self-learning application workloads, in accordance with the techniques described in this disclosure. In the example of FIG. 6, energy efficiency module 32 of edge services controller 28 may determine a green quotient of an application and invoke one or more actions based on the green quotient of the application to improve energy usage of the data center deploying the application.

For example, energy efficiency module 32 of edge services controller 28 may obtain energy usage data of a data center (602). The energy usage data of the data center may comprise a current energy usage ($E_C$) of the data center and a total energy usage ($E_T$) of the data center if the data center were to run at full capacity. As one example, edge services controller 28 may obtain energy usage data from edge service platform (ESP) agents (e.g., ESP agent 236 of FIG. 2) of computing devices (e.g., computing device 200 of FIG. 2) that specifies the current energy usage of computing devices within the data center. In some examples, edge services controller 28 may obtain total energy usage data from information provided by manufacturers of computing devices within the data center, such as manufacturer provided documentation specifying maximum energy capacity of the computing devices.

Energy efficiency module 32 of edge services controller 28 may determine, based on the energy usage data of the data center when the application is running, a first energy quotient ($E_Q$) that indicates a percentage of the total energy usage of the data center consumed by the current energy usage of the data center that is running the application (604). Energy efficiency module 32 of edge services controller 28 may compare the first energy quotient of the data center that is not running the application to a percentage of energy provided by one or more renewable energy sources to the data center, e.g., green energy percentage (g) (606), and based on the comparison of the energy quotient ($E_Q$) of the data center that is running the application with the green energy percentage (g) of the data center, energy efficiency module 32 of edge services controller 28 may specify a value for a first green quotient of the data center that is running the application ($GQ_{dc2}$) that indicates an energy usage of the data center when the application is running (608). For example, if the energy quotient ($E_Q$) of the data center that not running the application is less than or equal to the green energy percentage (g) of the data center (e.g., $E_Q \leq g$), energy efficiency module 32 specifies a value (e.g., 100) for the first green quotient of the data center that is running the application ($GQ_{dc2}$) that indicates the data center is energy efficient (e.g., "green"). If the energy quotient ($E_Q$) of the data center is greater than the green energy percentage (g) of the data center (e.g., $E_Q > g$), energy efficiency module 32 specifies a value $$\left( e.g.,\ 101 - 101^{\left(\frac{E_Q - g}{100 - g}\right)} \right)$$

for the green quotient of the data center that is running the application ($GQ_{dc2}$) that indicates the data center energy usage is not energy efficient (e.g., "not green"). In some examples, the first green quotient is computed from an average of green quotients of the data center when the application is running that were determined over a period of time.

Energy efficiency module 32 of edge services controller 28 may also determine, based on the energy usage data of the data center when the application is not running, a second energy quotient ($E_Q$) of the data center that is running the application that indicates a percentage of the current energy usage of the data center that is not running the application to the total energy usage of the data center (610). Energy efficiency module 32 of edge services controller 28 may compare the energy quotient of the data center that is not running the application to a percentage of energy provided by one or more renewable energy sources to the data center, e.g., green energy percentage (g) (612), and based on the comparison of the energy quotient ($E_Q$) of the data center that is not running the application with the green energy percentage (g) of the data center, energy efficiency module

32 of edge services controller 28 may specify a value for a second green quotient of the data center that is not running the application ($GQ_{dc1}$) that indicates the energy usage of the data center when the application is not running (614).

Energy efficiency module 32 of edge services controller 28 may compute a delta between the first green quotient ($GQ_{dc2}$) of the data center that is running the application and the second green quotient of the data center that is not running the application ($GQ_{dc1}$), to compute an energy usage of the application ($GQ_A$) (618). For example, energy efficiency module 32 of edge services controller 28 may compute a difference of the first green quotient of the data center that is running the application and the second green quotient of the data center that is not running the application (e.g., $GQ_{dc2}$-$GQ_{dc1}$). Energy efficiency module 32 of edge services controller 28 may compare the delta between the first green quotient and the second green quotient to a percentage of energy provided by one or more renewable energy sources to the data center (g), and based on the comparison, may determine the green quotient of the application ($GQ_{app}$) that specifies a value that indicates whether the data center deploying the application is energy efficient (620). For example, if the energy usage of the application ($GQ_A$) is less than or equal to the green energy percentage (g) of the data center (e.g., $GQ_A \leq g$), energy efficiency module 32 specifies a value (e.g., 100) for the green quotient of the application ($GQ_{app}$) that indicates the data center deploying the application is energy efficient (e.g., "green"). If the energy usage of the application ($GQ_A$) is greater than the percentage of energy provided by one or more renewable energy sources to the data center (e.g., $GQ_A > g$), energy efficiency module 32 specifies a value (e.g., not 100) for the green quotient of the application ($GQ_{app}$) that indicates the data center deploying the application is not energy efficient.

If the green quotient of the application indicates the data center deploying the application is not energy efficient ("NO" of step 622), energy efficiency module 32 may cause edge services controller 28 to invoke one or more actions to improve energy usage of the data center (624). For example, energy efficiency module 32 may, in response to determining that the green quotient of the application is a value that indicates the data center 10 is not green (e.g., not 100), cause edge services controller 28 to automatically deploy application workloads, migrate application workloads to fewer servers and shutdown remaining unused servers, proactively activate the cooling system of the data center prior to the temperature of data center 10 exceeding a configured temperature threshold, disable the scaling of applications if the energy usage of the application exceeds a configured threshold, or other actions to improve the energy usage of the data center that is running the application.

If the green quotient of the application indicates the data center deploying the application is energy efficient ("YES" of step 622), energy efficiency module 32 may restart the process (e.g., at step 602) to determine whether the data center deploying the application is energy efficient or stop the process (628).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:

obtaining, by a computing system, energy usage data of a data center deploying an application;

computing, by a computing system and based on a comparison of the energy usage data of the data center deploying the application to a percentage of energy provided by one or more renewable energy sources to the data center, a green quotient of the application that specifies a value that indicates whether the data center deploying the application is energy efficient; and invoking, by a computing system and based on the green quotient of the application that specifies a value that indicates the data center deploying the application is not energy efficient, an action to improve energy usage of the data center deploying the application, wherein the action comprises configuring one or more devices of the data center.

2. The method of claim 1, wherein computing the green quotient of the application comprises:

determining, based on energy usage data of the data center when the application is running, a first green quotient that indicates the energy efficiency of the data center when the application is running;

determining, based on energy usage data of the data center when the application is not running, a second green quotient that indicates the energy efficiency of the data center when the application is not running; and computing a delta between the first green quotient and the second green quotient;

specifying, based on comparing the delta between the first green quotient and the second green quotient to the percentage of energy provided by one or more renewable energy sources to the data center, a value for the green quotient of the application that indicates whether the data center deploying the application is energy efficient.

3. The method of claim 2, wherein the energy usage data comprises a current energy usage of the data center and a total energy usage of the data center if the data center were to run at full capacity;

wherein determining the first green quotient comprises:

determining a first energy quotient, wherein the first energy quotient of the data center indicates a percentage of the total energy usage consumed by the current energy usage of the data center when the application is running, and comparing the first energy quotient to a percentage of energy provided by one or more renewable energy sources to the data center; and wherein determining the second green quotient comprises:

determining a second energy quotient, wherein the second energy quotient of the data center indicates a percentage of the total energy usage consumed by the current energy usage of the data center when the application is not running, and comparing the second energy quotient to the percentage of energy provided by one or more renewable energy sources to the data center.

4. The method of claim 2, wherein the first green quotient comprises an average of a plurality of green quotients of data center when the application is running that were determined over a period of time.

5. The method of claim 2, wherein specifying, based on comparing the delta between the first green quotient and the second green quotient to a percentage of energy provided by one or more renewable energy sources to the data center, the value for the green quotient of the application that indicates whether the data center deploying the application is energy efficient comprises:

determining that the delta between the first green quotient and the second green quotient is less than or equal to the percentage of energy provided by one or more renewable energy sources to the data center; and in response to determining that the delta between the first green quotient and the second green quotient is less than or equal to the percentage of energy provided by one or more renewable energy sources to the data center, specifying a value of the green quotient of the application that indicates the data center deploying the application is energy efficient.

6. The method of claim 2, wherein specifying, based on comparing the delta between the first green quotient and the second green quotient to a percentage of energy provided by one or more renewable energy sources to the data center, the value for the green quotient of the application that indicates whether the data center deploying the application is energy efficient comprises:

determining that the delta between the first green quotient and the second green quotient is greater than the percentage of energy provided by one or more renewable energy sources to the data center; and in response to determining that the delta between the first green quotient and the second green quotient is greater than the percentage of energy provided by one or more renewable energy sources to the data center, specifying a value of the green quotient of the application that indicates the data center deploying the application is not energy efficient.

7. The method of claim 1, wherein configuring the one or more devices of the data center comprises one or more of:

automatically deploying the application to one or more select servers;

migrating the application from a first number of hosts to a second number of hosts that is fewer than the first number of hosts;

activating a cooling system of the data center deploying the application; or disabling workload scaling.

8. The method of claim 1, wherein computing the green quotient of the application that specifies the value that indicates whether the data center deploying the application is energy efficient comprises determining, based on a pattern of the energy usage of the data center, that the data center deploying the application is not energy efficient, and wherein invoking the action to improve energy usage of the data center comprises invoking, in response to determining that the data center deploying the application is not energy efficient, the action to improve energy usage of the data center before a next determining of whether the data center deploying the application is not energy efficient.

9. The method of claim 1, wherein invoking the action to improve energy usage of the data center comprises:

configuring a processing unit of a network interface card in a server of the data center to perform the action.

10. The method of claim 1, wherein invoking the action to improve energy usage of the data center comprises:

outputting an alert indicating to an administrator of the data center that the data center deploying the application is not energy efficient.

11. A computing system comprising:

a memory; and one or more processors in communication with the memory, the one or more processors configured to:

obtain energy usage data of a data center deploying an application;

compute, based on a comparison of the energy usage data of the data center deploying the application to a percentage of energy provided by one or more renewable energy sources to the data center, a green quotient of the application that specifies a value that indicates whether the data center deploying the application is energy efficient; and invoke, based on the green quotient of the application that specifies a value that indicates the data center deploying the application is not energy efficient, an action to improve energy usage of the data center deploying the application, wherein the action comprises configuring one or more devices of the data center.

12. The computing system of claim 11, wherein to compute the green quotient of the application, the one or more processors are configured to:

determine, based on energy usage data of the data center when the application is running, a first green quotient that indicates the energy efficiency of the data center when the application is running;

determine, based on energy usage data of the data center when the application is not running, a second green quotient that indicates the energy efficiency of the data center when the application is not running; and computing a delta between the first green quotient and the second green quotient;

specify, based on comparing the delta between the first green quotient and the second green quotient to the percentage of energy provided by one or more renewable energy sources to the data center, the value for the green quotient of the application that indicates whether the data center deploying the application is energy efficient.

13. The computing system of claim 12, wherein the energy usage data comprises a current energy usage of the data center and a total energy usage of the data center if the data center were to run at full capacity;

wherein to determine the first green quotient, the one or more processors are configured to:

determine a first energy quotient, wherein the first energy quotient of the data center indicates a percentage of the total energy usage consumed by the current energy usage of the data center when the application is running, and compare the first energy quotient to a percentage of energy provided by one or more renewable energy sources to the data center; and wherein to determine the second green quotient, the one or more processors are configured to:

determine a second energy quotient, wherein the second energy quotient of the data center indicates a percentage of the total energy usage consumed by the current energy usage of the data center when the application is not running, and compare the second energy quotient to the percentage of energy provided by one or more renewable energy sources to the data center.

14. The computing system of claim 12, wherein the second green quotient comprises an average of a plurality of green quotients of data center when the application is running that were determined over a period of time.

15. The computing system of claim 12, wherein to specify, based on comparing the delta between the first green quotient and the second green quotient to a percentage of energy provided by one or more renewable energy sources to the data center, the value for the green quotient of the application that indicates whether the data center deploying the application is energy efficient, the one or more processors are configured to:

determine that the delta between the first green quotient and the second green quotient is less than or equal to the percentage of energy provided by one or more renewable energy sources to the data center; and in response to determining that the delta between the first green quotient and the second green quotient is less than or equal to the percentage of energy provided by one or more renewable energy sources to the data center, specify a value of the green quotient of the application that indicates the data center deploying the application is energy efficient.

16. The computing system of claim 12, wherein to specify, based on comparing the delta between the first green quotient and the second green quotient to a percentage of energy provided by one or more renewable energy sources to the data center, the value for the green quotient of the application that indicates whether the data center deploying the application is energy efficient, the one or more processors are configured to:

determine that the delta between the first green quotient and the second green quotient is greater than the percentage of energy provided by one or more renewable energy sources to the data center; and in response to determining that the delta between the first green quotient and the second green quotient is greater than the percentage of energy provided by one or more renewable energy sources to the data center, specify a value of the green quotient of the application that indicates the data center deploying the application is not energy efficient.

17. The computing system of claim 11, wherein to configure the one or more devices of the data center, the one or more processors are configured to perform one or more of:

automatically deploy the application to one or more select servers;

migrate the application from a first number of hosts to a second number of hosts that is fewer than the first number of hosts;

activate a cooling system of the data center deploying the application; or disable workload scaling.

18. The computing system of claim 11, wherein to compute the green quotient of the application that specifies the value that indicates whether the data center deploying the application is energy efficient, the one or more processors are further configured to determine, based on a pattern of the energy usage of the data center, that the data center deploying the application is not energy efficient, and wherein to invoke the action to improve energy usage of the data center, the one or more processors are further configured to invoke, in response to determining that the data center deploying the application is not energy efficient, the action to improve energy usage of the data center before a next determining of whether the data center deploying the application is not energy efficient.

19. The computing system of claim 11, wherein to invoke the action to improve energy usage of the data center, the one or more processors are configured to:

configure a processing unit of a network interface card in a server of the data center to perform the action.

20. Non-transitory computer-readable media having instructions that, when executed, cause one or more processors to:

obtain energy usage data of a data center deploying an application;

compute, based on a comparison of the energy usage data of the data center deploying the application to a percentage of energy provided by one or more renewable energy sources to the data center, a green quotient of the application that specifies a value that indicates whether the data center deploying the application is energy efficient; and invoke, based on the green quotient of the application that specifies a value that indicates the data center deploying the application is not energy efficient, an action to improve energy usage of the data center deploying the application, wherein the action comprises configuring one or more devices of the data center.

* * * * *